UNITED STATES PATENT OFFICE.

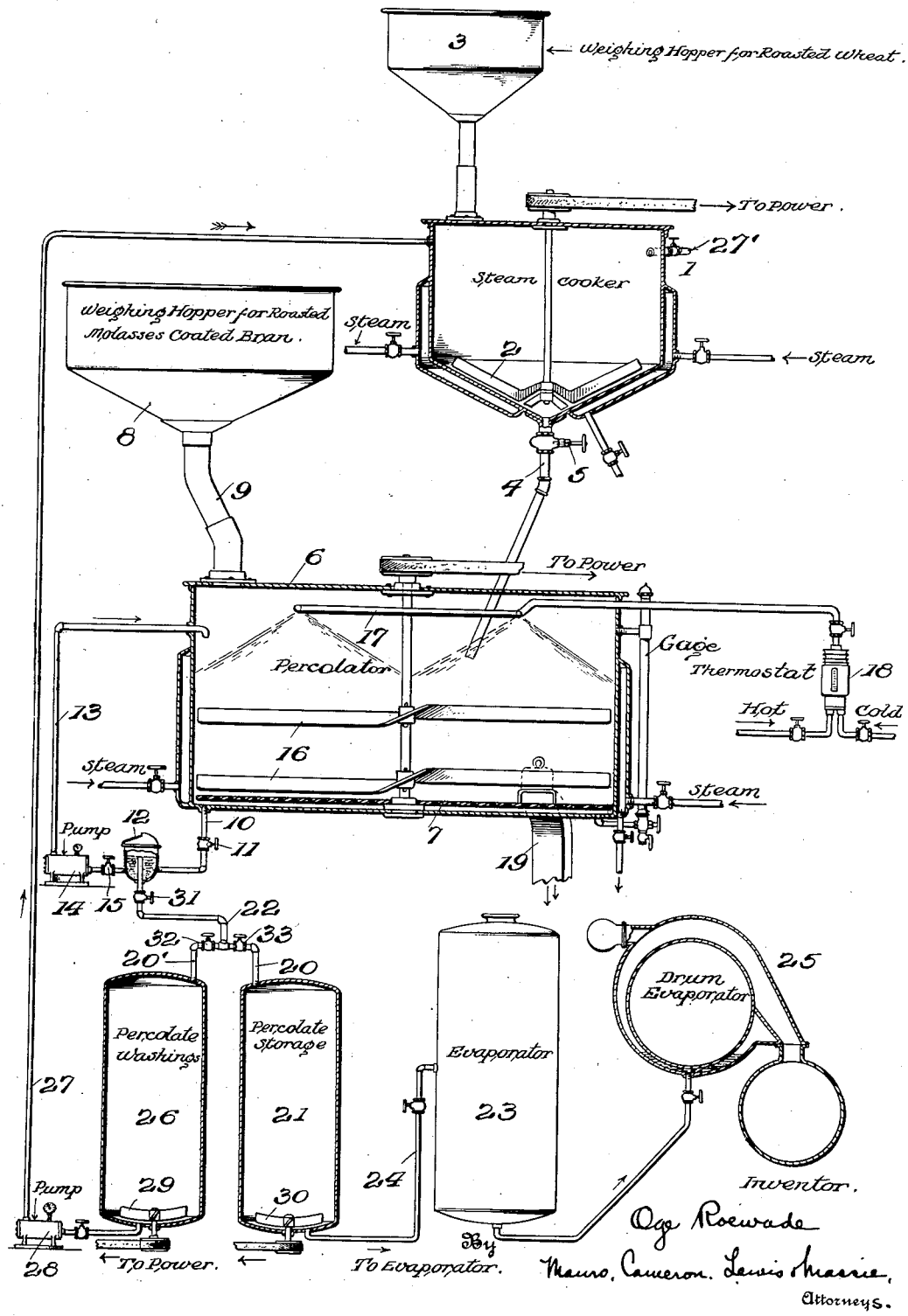

OGE ROEWADE, OF BATTLE CREEK, MICHIGAN, ASSIGNOR, BY MESNE ASSIGNMENTS, TO POSTUM CEREAL COMPANY, INC., OF WILMINGTON, DELAWARE, A CORPORATION OF DELAWARE.

MANUFACTURE OF SOLID, SOLUBLE BEVERAGE EXTRACT.

1,366,495.     Specification of Letters Patent.     Patented Jan. 25, 1921.

Application filed March 8, 1918. Serial No. 221,315.

*To all whom it may concern:*

Be it known that I, OGE ROEWADE, a citizen of the United States of America, and a resident of Battle Creek, Michigan, have invented a new and useful Improvement in the Manufacture of Solid, Soluble Beverage Extracts, which invention is fully set forth in the following specification.

This invention relates to improvements in making solid, soluble beverage extracts from roasted carbohydrate materials, such as starch-containing cereals, sugar and the like, and more particularly to improvements in the method of extracting the soluble constituents from said materials, whereby more rapid and complete extraction may be secured, and economy in heat, time and labor effected, while giving the proper control over the operation and improving the flavor of the product.

Heretofore, roasted carbohydrate mixtures adapted for the preparation of solid beverage extracts, such as the mixture of roasted wheat and roasted molasses-coated bran described in U. S. patent to Post No. 1,031,962, have been extracted by percolating or by boiling the mixture in water, separating the fluid extract from the insoluble mass, and evaporating said extract to dryness. Furthermore, roasted bran and caramelized saccharine matter have been extracted; roasted grain also extracted; the separate extracts united and evaporated to recover the solid soluble extracts.

When the grain is treated as in percolating, especially at a boiling temperature, in the presence of bran, there is formed a more or less impervious mass which renders percolation, and hence extraction, slow and difficult. The boiling, or percolating at high temperature, packs or mats the bran to such an extent as to retard the free passage therethrough of the water solvent, and this consumes time in the percolation and wastes heat in raising a large mass of bran and water to a higher temperature than would otherwise be necessary for its extraction. When the bran and caramelized saccharine body are extracted separately from the grain, the extraction of the materials by separate portions of solvent necessitates the evaporation of too large an amount of water at the expense of time and fuel to obtain the dry extract.

I have discovered that the above objections may be overcome, and that a larger yield of extract may be obtained from the same materials, while improving the flavor of the product, by separately cooking the roasted cereal with water, and then mixing the cooked cereal with the roasted bran and caramelized saccharine material, preferably adding more water to the mixture, digesting (*i. e.*, subjecting to the action of heat and water) the mixture at a temperature preferably below that at which the roasted cereal was cooked, separating the liquid extract, and recovering the solid soluble material therefrom by evaporation.

Preferably, aft r the liquid extract has been drained off from the residue consisting of cellular material, I wash such residue with water at a temperature below boiling, and use this wash water in cooking the roasted cereal for the next extracting operation.

My invention resides in the process followed, and in order that it may be more readily understood, it will be described as applied to the preparation of a solid soluble beverage extract from roasted wheat, roasted bran and caramelized molasses, though it is to be understood that the invention may be applied to making solid beverage extracts from other cereals and saccharine substances wherewith bran-like materials are used.

While the proportions of the starting materials employed may be somewhat varied, I have found that 500 pounds of bran, preferably wheat bran, mixed with 8 gallons of good molasses, such as standard New Orleans molasses, and 250 pounds of wheat, give excellent results; or I may use 3 parts by weight of roasted molasses-coated bran to one part of roasted wheat.

My invention consists in first roasting the wheat or equivalent cereal to effect the dextrinizing of the starchy contents thereof; roasting the molasses-coated bran whereby the saccharine matter of the molasses is caramelized and certain of the solids of the bran rendered readily soluble; and then, before mixing the roasted cereal with the roasted bran and caramelized saccharine body, cooking the roasted cereal, preferably in a finely ground condition. This I accomplish by cooking the roasted cereal (before mixing it with the roasted bran and caramelized saccharine body) by subjecting it to heat and moisture. After the roasted cereal has thus been cooked, the entire mass is mixed with the roasted bran and saccharine body and treated by percolation. By this process, the soluble contents of the whole mass are quickly and thoroughly extracted at a moderate temperature, thereby not only increasing the yield, but also greatly shortening the time, and hence the expense, of the extraction. Another feature of advantage is that, by reason of the moderate temperature at which the process is carried on after the cooking of the cereal, the matting or packing of the bran which results from the employment of a higher temperature is avoided, thus maintaining the mass in a more open and porous condition, and facilitating the rapid extraction.

While any suitable form of apparatus may be employed for carrying out the process, one such form is diagrammatically shown in the accompanying drawing, in which—

1 is a steam-jacketed, closed cooker, preferably in the form of a cylindrical vessel provided with a stirring device 2. A weighing feed hopper 3 for roasted grain delivers into the top of the cooker 1, and a discharge pipe 4 controlled by a gate valve 5 leads from the bottom of the cooker 2 into the top of a closed steam-jacketed percolating tank 6 provided with a perforated false bottom 7. A weighing hopper 8, preferably located in a plane above the percolating tank 6, is provided for weighing the roasted molasses-coated bran, and this hopper delivers, through the pipe 9, into the tank 6. Leading out of the bottom of the tank 6 is a pipe 10 controlled by a valve 11, and this pipe is provided with an extract-observation device 12, whereby the character of the extract delivered from the tank 6 can be observed. A pipe having a valve 15 connects this observation device 12 with a pump 14, which pump delivers through a pipe 13 into the upper portion of the percolating tank 6, so that the fluid from the bottom of the tank 6 can be pumped through the pipes 10 and 13 and the observation device 12, and delivered to again pass through the material in the percolating tank. Within the tank 6 are suitable stirring blades 16, and a sprayer 17 for supplying water, the temperature of which is controlled by any suitable means such as a thermosensitive-controlled hot and cold mixer 18, of any ordinary or well-known construction. A pipe 19 is provided for discharging the residue or grounds at the close of the operation, after the fluid extract has been withdrawn from the percolator. A storage tank 21 is provided for the temporary reception of a clear percolate entering therein through pipe 20, which is a branch of pipe 22 communicating with pipe 10, preferably through the percolate observation device 12, pipe 20 being controlled by a valve 33 and the pipe 22 by a valve 31. The percolate storage tank 21 is connected to an evaporator 23 by a suitably valved pipe 24, and the evaporator 23 in turn communicates through a suitable pipe, preferably leading from the bottom thereof, with a vacuum drum drier 25 of the usual or any suitable construction.

A second storage tank 26 is provided into which the pipe 22 delivers through a branch 20' controlled by a valve 32, and a pipe line 27 leads from the bottom of this storage tank 26 to the upper portion of the steam cooker 1, a pump 28 being interposed in the pipe line 27. Suitable power-driven stirrers 29 and 30 are located respectively in the tanks 26 and 21.

In carrying out the process and treating, for example, roasted bran and molasses, and roasted wheat, indicated above, the roasted wheat, preferably in a finely ground condition, is run from the weighing hopper 3 into the cooker 1, and for each 100 pounds of roasted wheat about 50 to 60 gallons of water are supplied to the cooker. This may be ordinary water, in which case it is supplied through the pipe 27', or, preferably, it is percolate wash-water from a previous operation, in which case it is supplied to the cooker from the tank 26 through the pipe 27. The mass is then subjected to the action of heat for a suitable length of time. Preferably, it is maintained at approximately 212° F. for about 5 minutes by steam introduced into the steam-jacket of the cooker, while the mass is stirred by the stirrer 2. In the meantime, roasted molasses-coated bran is weighed from the hopper 8 into the percolator 6. The gate valve 5 is then opened and the cooked mass is delivered through the pipe 4 onto the bran in percolator 6, and water through the sprayer 17 is introduced to cover the mass, the height being indicated by a suitable gage, and the stirrers 16 set in operation. The temperature of the charge in the percolator 6 is kept lower than in the cooker, preferably from about 180° to 195° F., the object being to utilize the requisite amount of heat for extracting the desired constituents of the bran portion while avoiding percolating difficulties such as packing of the bran, which usually occurs when the bran is subjected to a higher cooking temperature. After the mass is thoroughly stirred, it is allowed to subside for approximately 30 minutes, at the end of which time valves 11 and 15 in the percolate circulating conduit 10—13 are opened, communication with the tanks 21 and 26 being cut off by valve 31. Pump 14 is started and the percolate is drawn out from below the perforated bottom 7 and returned to the percolate tank through the pipe 13, and this continues until observation through the device 12 shows the percolate running clear.

This point having been reached, the valves 15 and 32 are closed, and the valves 31 and 33 are opened, so that the percolate in the percolator 6 may be drained directly therefrom into the percolate storage tank 21, from which it is delivered to the evaporator 23 where it is partially evaporated, and then to the drum evaporator 25.

In order to obtain any residue of extractive material still remaining in the mass of grounds or residue of wheat and molasses-coated bran in the percolator, this mass of residue is sprayed with water (after the valve 33 is closed, so as to cut off the percolating tank 6 from the storage tank 21) and if desired, the proper valves may be opened and the pump 14 started to pass the spray-water through the pipes 10 and 13 and pass it again through the mass, though this is not essential. Valve 15 being closed, and the valve 32 being opened, this wash-water or weak percolate is then directed into the percolate washing tank 26 through pipes 10, 22 and branch pipe 20'. The wash-water is supplied for this purpose at a preferred temperature of about 180° to 195° F. by the hot and cold water mixer 18 through the sprayer 17. All of the weak percolate or percolate washings having been withdrawn from the percolator 6 into the percolate washings tank 26, the extracted grounds in the percolator 6 are removed through the pipe 19.

The next batch of roasted wheat having been placed in the cooker 1, a suitable amount of percolate washings from the tank 26 is pumped into the cooker through the pipe 27 by the pump 28, and the wheat having been cooked for the proper length of time in this weak percolate either with or without the addition of water through pipe 27', is then delivered into the percolator, and the operation repeated.

Preferably, the evaporation of the percolate to secure a solid, soluble product is performed *in vacuo*, as described in U. S. patent to Post No. 1,031,962, though the evaporation to a solid may be carried out in other ways, the particular method of evaporation employed not forming an essential part of this invention.

By this process the amount of solid soluble extract obtained from a given amount of starting materials is increased, the cost of the operation is decreased, and the solubility and flavor of the resulting product in no way impaired.

What is claimed is:—

1. The process which consists in first cooking roasted cereal in water to form a fluid mixture, then mixing said cooked mass with roasted bran and caramelized saccharine matter, digesting this mixture after an addition of water whereby a fluid extract of the mass is obtained, and then draining off the said extract and recovering the soluble matter therefrom by evaporation.

2. The process specified in claim 1 characterized by the use of roasted wheat, roasted bran and caramelized molasses as the materials.

3. The process specified in claim 1 characterized by washing the mass with water after draining off the fluid extract and using the wash water in which to cook another portion of roasted cereal for repeating the process of extraction.

4. The process specified in claim 1, characterized by digesting the mixture of cooked cereal, roasted bran and caramelized saccharine matter at a temperature below that employed for cooking the cereal.

In testimony whereof I have signed this specification.

OGE ROEWADE.